Jan. 11, 1927.  F. B. LEOPOLD  1,613,663
MIXING APPARATUS
Filed June 6, 1925   2 Sheets-Sheet 1

INVENTOR
Frederick B. Leopold
By Kay, Totten & Martin,
Attorneys

Jan. 11, 1927.

F. B. LEOPOLD 1,613,663

MIXING APPARATUS

Filed June 6, 1925     2 Sheets-Sheet 2

INVENTOR
Frederick B. Leopold
By Kay, Totten & Martin,
Attorneys.

Patented Jan. 11, 1927.

1,613,663

UNITED STATES PATENT OFFICE.

FREDERICK B. LEOPOLD, OF PITTSBURGH, PENNSYLVANIA.

MIXING APPARATUS.

Application filed June 6, 1925. Serial No. 35,336.

My invention relates to mixing apparatus, and is particularly applicable to apparatus for supplying lime for use in water purification systems or the like, but is of course suitable for more general use.

One object of my invention is to provide means for supplying a mixture of lime and water, in predetermined relative amounts, to a place of consumption.

Another object of my invention is to provide means for controlling the relative amounts of lime and water supplied to a hydrating chamber and to also control the relative amounts of hydrated lime and water supplied to a mixing chamber.

Still another object of my invention is to simplify and improve generally the structure and operation of mixing apparatus of the general type referred to.

Heretofore, the operation of supplying mixtures of lime and water has required a number of steps and numerous tanks. For instance, sharp or unslaked lime has been introduced into a large receiving chamber by means of shovels or rakes and there mixed with water for slaking the same. From the receiving tank the hydrated lime is discharged into a second larger tank wherein additional water is mixed therewith to dilute the mixture. Discharge is effected from this tank into other tanks or apparatus wherein the mixture is properly proportioned and fed to the point of consumption.

By the use of my system and apparatus, no tanks are required. The self-contained machine measures the pulverized lime continuously into a compartment where the hydrating is effected. It is then fed to another compartment in which additional water is added thereto, the mixture being delivered continuously directly from the solution compartment to the point of consumption.

Not only do I provide means for accurately controlling the relative amounts of lime and water supplied for hydrating and mixing and thereby deliver a mixture of the proper dilution, but I may accurately control the total amount of lime and water supplied to the system and hence the supply from the system in a desired volume which may be varied as conditions may require.

I also provide means for utilizing the heat which is generated by the slaking of lime in the hydrating chamber, for increasing the temperature of the water by means of which the lime is hydrated or slaked, thus effecting quicker and more thorough hydration of the lime.

Figure 1:
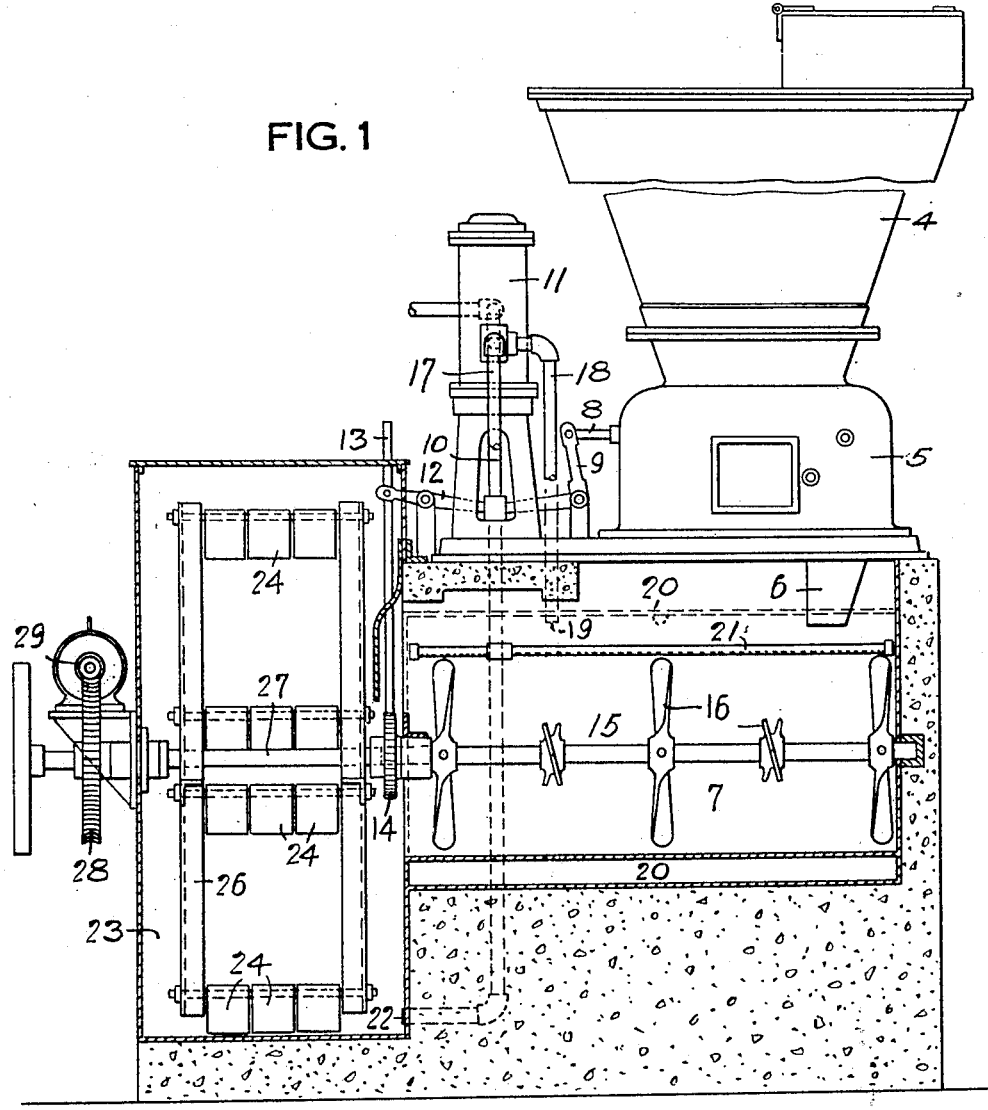
Figure 2:
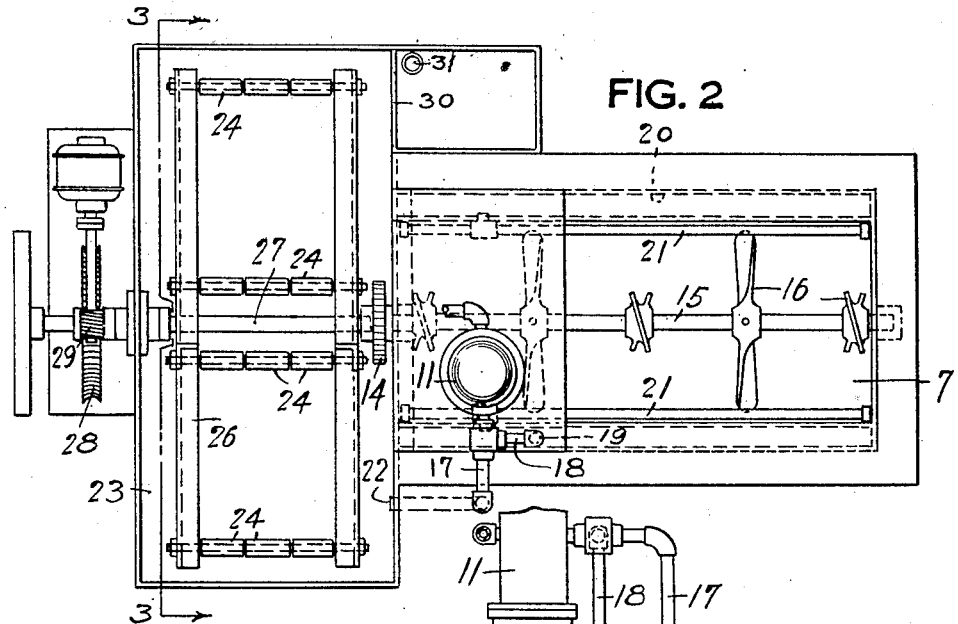
Figure 3:
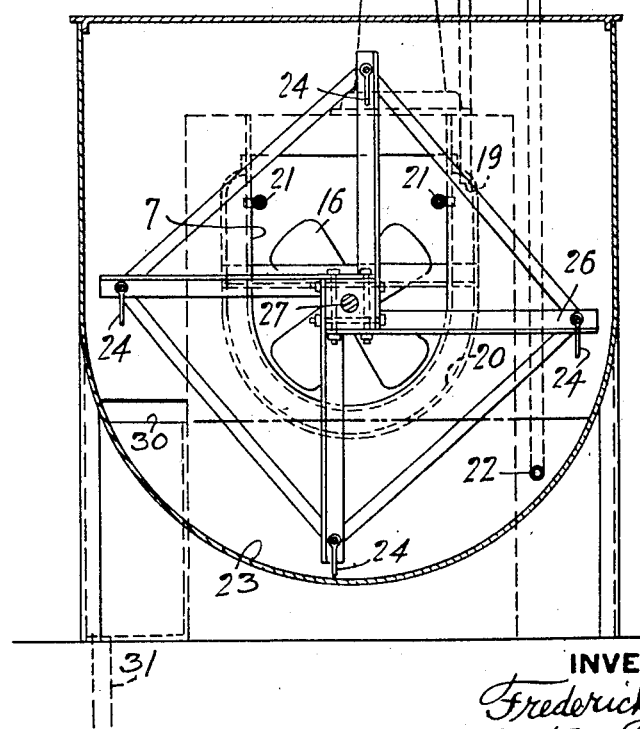

One of the forms which my invention may take is shown in the accompanying drawing wherein Fig. 1 is a view, partially in side elevation and partially in section, of apparatus wherein my invention is embodied; Fig. 2 is a plan view of the apparatus of Fig. 1, and Fig. 3 is an end elevational view of the apparatus, taken on the line 3—3 of Fig. 2.

The apparatus comprises a feed or storage chamber 4 in the lower portion of which feeding apparatus (not shown) is located. This feeding apparatus may take the form of that shown in my Patent No. 1,537,123, issued May 12, 1925, although any other desired form of feeding mechanism for the sharp or unslaked lime may be provided. From the compartment 5, the lime is fed by suitable mechanism as just referred to, through a chute or spout 6 into a hydrating compartment 7. The feeding apparatus may have a pawl and ratchet that is actuated through a rod 8 that is connected to a bell crank 9 which in turn has connection with the piston rod 10 of a water motor 11. As the piston rod is reciprocated, the bell crank lever 9 will be oscillated and effect a feed of lime through the spout 6 at a rate dependent upon the speed of the motor 11, or dependent upon the adjustment of the feeding apparatus providing such apparatus is made adjustable, as for instance, in the manner shown in my patent above referred to.

The piston rod 10 is also connected through a lever 12 which is pivoted intermediate its ends, to a rod 13 that has a pawl connection with a ratchet wheel 14 so that as the piston rod 10 reciprocates, the rod 13 will also be reciprocated to effect rotative movements of the wheel 14. The wheel 14 is rigidly secured to a shaft 15 mounted in bearings in the ends of the hydrating chamber 7. Propeller blades 16 are secured to the shaft 15 for rotative movement therewith. It will be seen that the feeding mechanism and the propellers are driven in definite relation to one another, by reason of their connection to a common source of power. It will be understood that other forms of motors, as electric motors or the like, may be employed for actuating the feed mechanism and for controlling a water supply, through suitable connections.

In addition to driving the lime feeding and propeller mechanisms in a definite relation, I provide means for automatically supplying water to the hydrating chamber in definite relation to the movements of the mechanisms referred to. One manner in which this may be accomplished is by providing a pipe 18 for conducting exhaust water from the motor 11. The volume of exhaust water is ordinarily greater than is required for hydrating lime and I therefore connect a pipe 17 to the exhaust, which, as shown more clearly in Fig. 1, has communication at the point 19 with a space 20 extending around the sides and the bottom of the chamber 7 in the manner shown more clearly in Fig. 3. The spray pipes 21 communicate with the upper portions of the chamber 20 so that when the motor is being operated and lime fed to the chamber 7, water for hydrating lime is supplied in a quantity depending upon the amount of the lime being fed through the chute 6. The water becomes heated while passing through the chamber 20 and spray pipes 21 by reason of heat absorbed from the lime being treated in the chamber 7, thus rendering the water more effective in slaking or hydrating the lime.

That portion of the exhaust water which is diverted through the pipe 17 is conducted to the point 22 at which it enters a mixing or solution chamber 23. The propellers 16 discharge the hydrated lime from the chamber 7 to the chamber 23. In the chamber 23 the lime is mixed with a further quantity of water to form the desired mixture of lime and water. This mixing is effected by vanes or paddles 24 that are mounted upon a revolving frame 26 that is carried by a shaft 27. The shaft 27 is supported in bearings in the walls of the chamber 23 and is provided at its outer end with a worm gear 28 that is driven by a worm 29 which may in turn be driven by a water motor or in some other manner. Should the volume of water in the chamber 23 from the exhaust pipe 10 be insufficient to meet the requirements, additional water may be supplied to such chamber from either the motor which drives the worm 29 or from some other source.

From the chamber 23 the mixture flows over the edge of the wall 30 of the chamber to an outlet pipe 31 by means of which it is conveyed to the point of consumption.

I claim as my invention:

1. Mixing apparatus comprising a feed chamber, a hydrating chamber, means for supplying material to be hydrated from said feed chamber to the hydrating chamber, means controlled by the material supplying means for supplying liquid to the hydrating chamber, and mixing devices in said hydrating chamber operated in a definite relation to the means for supplying the dry material.

2. Mixing apparatus comprising a mixing chamber, means for supplying dry material thereto, means for supplying liquid thereto, and means for agitating said dry and liquid materials, the said three means being so mechanically connected as to operate in automatic relation with respect to one another.

3. Lime treating apparatus comprising a hydrating chamber and a solution chamber, mixing devices in each of said chambers, means for feeding lime to said chambers, a water motor for driving one of said devices and said feeding means, and means for conducting water escaping from said motor to said chambers.

4. Mixing apparatus comprising a feed chamber, a hydrating chamber, feeding mechanism for moving material from said feed chamber to the hydrating chamber, and means controlled by said mechanism for supplying liquid to said hydrating chamber in variable quantities dependent upon the speed of said mechanism.

5. Mixing apparatus comprising a chamber having a mixing device therein, means for supplying solid material to said chamber, a water motor for driving said mixing device, and means for diverting a portion of the water from said motor to said chamber.

In testimony whereof I, the said FREDERICK B. LEOPOLD, have hereunto set my hand.

FREDERICK B. LEOPOLD.